(12) United States Patent
Poyil et al.

(10) Patent No.: US 8,929,664 B2
(45) Date of Patent: Jan. 6, 2015

(54) SHAPE DETECTION USING CHAIN CODE STATES

(75) Inventors: Bijesh Poyil, Bangalore (IN); Gopal Gudhur Karanam, Bangalore (IN); Ramandeep Singh Kukreja, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 413 days.

(21) Appl. No.: 13/483,540

(22) Filed: May 30, 2012

(65) Prior Publication Data

US 2013/0322771 A1 Dec. 5, 2013

(51) Int. Cl.
*G06K 9/46* (2006.01)

(52) U.S. Cl.
USPC .......................................... 382/203

(58) Field of Classification Search
USPC .......................................... 382/181, 203, 231
See application file for complete search history.

(56) References Cited

U.S. PATENT DOCUMENTS 4,783,828 A * 11/1988 Sadjadi .................. 382/170
6,639,593 B1 * 10/2003 Yhann .................... 345/419

OTHER PUBLICATIONS

Junding et al, "Contour-Shape recognition and retrieval based on chain code", Dec. 2009, International Conference on Computational Intelligence and Security, pp. 349-352.*
Livarinen et al., "Shape Recognition of Irregular Objects", Helsinki University of Technology, Laboratory of Computer and Information Science Rakentajanaukio 2 C, FIN-02150 Espoo, Finland (8 pages).
International Search Report and Written Opinion of the International Searching Authority for International Application No. PCT/US2013/041774, dated Aug. 9, 2013, 12 pages.
Prajwal Shetty, "Circle Detection in Images," A Thesis Presented to the Faculty of San Diego State University, Summer 2011, 63 pages.
Dr. Azzam Talal Sleit, "A Chain Code Approach for Recognizing Basic Shapes," King Abdullah II for Information Technology College, University of Jordan, Amman, Jordan, Apr. 2006, 5 pages.
Abdel-Badeeh M. Salem et al., "A Vertex Chain Code Approach for Image Recognition," ICGST-GVIP Journal, vol. 5, Issue 3, Mar. 2005, Assiut University, Assiut, Egypt, 8 pages.
Haihong Chi et al., "Curve Tracking with Improved Chain Code Algorithm," 2009 International Conference on Mechatronics and Automation, Aug. 1, 2009, Abstract Only, 1 page.

* cited by examiner

*Primary Examiner* — Edward Park
(74) *Attorney, Agent, or Firm* — Patent Capital Group

(57) ABSTRACT

A method for identifying objects in a digital image includes tracing chain codes associated with the contour of the object; a series of states is maintained, and the next chain codes in the contour are accepted only if they comply with allowed chain codes for each state. Certain chain codes trigger a transition into a next state. If a disallowed chain code is encountered, the process halts.

30 Claims, 14 Drawing Sheets

700

| State (702) | Next State (704) | State-Transition Code (706) | State-Maintaining Codes (708) |
|---|---|---|---|
| S0 | S1 | 15 | 8, 9 |
| S1 | S2 | 14 | 8, 15 |
| S2 | S3 | 13 | 14, 15 |
| S3 | S4 | 12 | 13, 14 |
| S4 | S5 | 11 | 12, 13 |
| S5 | S6 | 10 | 11, 12 |
| S6 | S7 | 9 | 10, 11 |
| S7 | S0 | 8 | 9, 10 |

| State | Next State | State-Transition Code | State-Maintaining Codes |
|---|---|---|---|
| S0 | S1 | 9 | 15, 8 |
| S1 | S2 | 10 | 8, 9 |
| S2 | S3 | 11 | 9, 10 |
| S3 | S4 | 12 | 10, 11 |
| S4 | S5 | 13 | 11, 12 |
| S5 | S6 | 14 | 12, 13 |
| S6 | S7 | 15 | 13, 14 |
| S7 | S0 | 8 | 14, 15 |

FIG. 9

SHAPE DETECTION USING CHAIN CODE STATES

TECHNICAL FIELD

Embodiments of the present invention relate generally to image processing and, more specifically, to detecting shapes in images.

BACKGROUND

Detection of round (i.e., circular and/or elliptical) objects in a digital image is a common task in many image-processing applications. For example, it is used in industrial applications, such as automatic inspections and assembly, in which many components are round-shaped. Traffic signs in European, Asian, and other countries have circular shapes, and automatic detection of these signs often involves circle/ellipse detection as a first step. Circle-detection techniques are also employed in, for example, localizing inner and outer boundaries of a human iris for iris-recognition algorithms used in biometric identification applications.

One method of detecting round objects in an image uses chain codes. A chain code is an image-compression format for efficiently representing foreground objects in a monochrome image by storing information representing only the contour (also known as the border or the boundary) of the objects. An x,y coordinate corresponding to an arbitrary point on the contour of a foreground object is first located. The object's contour is traversed from this x,y coordinate and, for each new pixel discovered in the contour, a symbol representing the direction of travel from the previous pixel is identified. For example, if the last pixel in the traversed contour was to the left of the next pixel, the symbol "E" might be stored (i.e., the contour just moved "east" one pixel); if the last pixel was below the next pixel, the symbol "N" might be stored (i.e., the contour just moved "north" one pixel). The object is thus represented by a start point and a series of directional movements relative to that start point that (eventually) lead back to the start. FIG. 1A illustrates a directional compass 100 defining a type of eight-direction chain code called a Freeman chain code, and FIG. 1B illustrates a circle 102 labeled with Freeman chain-code directions. The circle 102 might be represented, therefore, by the initial (x,y) point 104 and the Freeman chain codes 0, 1, 2, 3, 4, 5, 6, 7. More-complicated objects have, of course, more complicated chain codes.

Once a chain code is computed for a shape, it may be analyzed to attempt to determine certain properties of the shape (e.g., its type). For example, a histogram of the chain code (i.e., the number of 0s, 1s, 2s, etc. appearing in the chain code) may be analyzed. If the distribution of codes in the histogram is approximately uniform, for example, the shape may be a circle because, by definition, a circle transitions through every chain code, and does so for an equal amount of time per code. If the distribution is "symmetric" (i.e., if the number of opposite chain-code pairs 0/4, 1/5, 2/6, and 3/7 are roughly equal), the object may be a circle or ellipse. The "aspect ratio" of the histogram (i.e., the ratio of the horizontal-edge codes 0/4 to the vertical-edge codes 2/6) may be one for a circle and greater than one, but less than a maximum ellipticity/"ovalness" value, for an ellipse. The aspect ratio may be alternatively computed as the average of the ratios 0/4 to 2/6 and 1/5 to 3/7 to account for possible rotation away from horizontal or vertical of any ellipses in the image.

This method of shape identification (and specifically, the identification of circles and ellipses), while simple and efficient, has several drawbacks. The contour must be traversed in its entirety so that the complete histogram may be computed, thus wasting computation time by analyzing (what will eventually be identified as) non-round objects. Furthermore, the method may lead to many false-positive results, because certain non-round shapes (e.g., squares and rectangles) have chain-code histograms that are symmetric and/or have aspect ratios equal to one. Still other shapes, such as the shape 200 shown in FIG. 2, may have uniform histograms of chain-code symbols (i.e., the symbol 200 includes six codes of type "0," six codes of type "1," etc.) and yet be non-circular. Finally, this method is susceptible to occlusion or noise in the image; if, for example, an object of interest is occluded by another object or noise in the image prevents its full contour from being traced, the histogram produces misleading data (if it can even be computed at all).

Other methods of detecting round objects in images may be more accurate but consume greater computing resources, require more computing time, or both. A Hough-transform-based approach (using, specifically, a circular Hough transform) requires a three-dimensional accumulator array and a complicated "voting" technique to determine most-probable centers and radii of round objects, a process that requires a large amount of memory and computational power. A Markov-chain-based approach to building chain codes is unreliable at least because the probability of a particular chain code occurring is heavily dependent upon past chain codes (i.e., a side of a rectangle is assigned many "0" codes, for example, and the likelihood of a "3," "4," or "5" code is nearly zero), and this dependency reduces the accuracy of the Markov chain. Still other methods add position information (e.g., x,y coordinates) to each chain code, but this extra information greatly expands the size of the input data, rendering a main benefit of the chain codes moot. A need therefore exists for a way to quickly, efficiently, and accurately detect round objects in images.

SUMMARY

In general, various aspects of the systems and methods described herein detect round objects in digital images by tracing the contours of their chain codes. As the contour is traced, a series of states is maintained; only certain next chain codes are allowed in each state, and if a next chain code lies outside the permitted codes, the object is deemed non-round. The object may be further analyzed by examining its histogram and/or gradient. If the object was occluded in the original image and its contour is incomplete, a next chain code across a gap in the contour may be searched for.

In one aspect, a method for identifying an object in a digital image stored in a computer memory as an array of pixels includes traversing the pixels corresponding to a contour of an unknown object in the digital image. Traversing includes the steps of (i) loading a next chain-code symbol in the contour into a computer memory, (ii) maintaining a current state if the next chain-code symbol in the contour is within a first set of chain-code symbols, (iii) transitioning to a next state if the next chain-code symbol in the contour is within a second set of chain-code symbols, and (iv) designating the unknown object as a first type of object if the next chain-code symbol is within neither of the first or second sets of chain-code symbols. The unknown object is identified as a second type of object if a predetermined number of states are visited.

The first type of object may be a non-round object and the second type of object may be a round object. Extended chain codes may be assigned to pixels in the digital image; the extended chain codes may include a code for an end-of-contour pixel and a code for a multi-contour pixel. The digital image may be searched for a contour; searching for the contour may include searching for a chain code in the digital image or searching for an opposite chain code in the digital image. Searching for the contour may include searching for a first chain code in clockwise objects in the digital image and a for a second chain code in counter-clockwise objects in the digital image. The unknown object may be filtered via a chain-code histogram.

A gradient of a plurality of previous chain-code symbols may be computed, and the unknown object may be designated as a non-round object if the gradient is less than a first threshold or greater than a second threshold. Computing the gradient may include computing a first average of a first set of previous chain-code symbols, a second average of a second set of previous chain-code symbols, and computing the difference of the first and second averages. A break may be detected in the contour of the unknown object; an area of the image may be searched for the next chain-code symbol past the break. The size of the searched area may depend at least in part on an average direction of a plurality of previous chain codes or a number of previous chain codes.

In another aspect, a system for identifying an object in a digital image includes a computer memory for storing chain-code symbols related to a contour of an unknown object in the digital image. A processor traverses the contour by executing instructions for (i) maintaining a current state if a next chain-code symbol is within a first set of chain-code symbols, (ii) transitioning to a next state if the next chain-code symbol is within a second set of chain-code symbols, and (iii) designating the unknown object as a first type of object if the next chain-code symbol is within neither of the first or second sets of chain-code symbols. The unknown object is identified as a second type of object if a predetermined number of states are visited.

An image-capture device may capture the digital image, and a user interface may issue commands to, or receive data from, the processor. The system may be mounted on a vehicle. The second type of object may be a round object, and the object may be a road sign.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 7 is a table of state transitions in accordance with an embodiment of the invention;

FIG. 9 is another table of state transitions in accordance with an embodiment of the invention;

DETAILED DESCRIPTION

Described herein are various embodiments of methods and systems for identifying round objects in images. In one embodiment, the contour of an unknown object is traced while a series of states is maintained. In each state, the next chain code in the contour is examined; only a subset of codes are allowed for a given state, and if the next code is not one of the allowed codes, the object is deemed to be a non-round object. The disallowed codes correspond to directions inconsistent with circles and ellipses, such as sharp corners or "S" curves. In one embodiment, the allowed codes are separated into two categories: a first category that maintains the current state and a second category that triggers a transition to a next state. Each state may have different allowed codes, and each category may have one or more types of codes.

Figure 3:
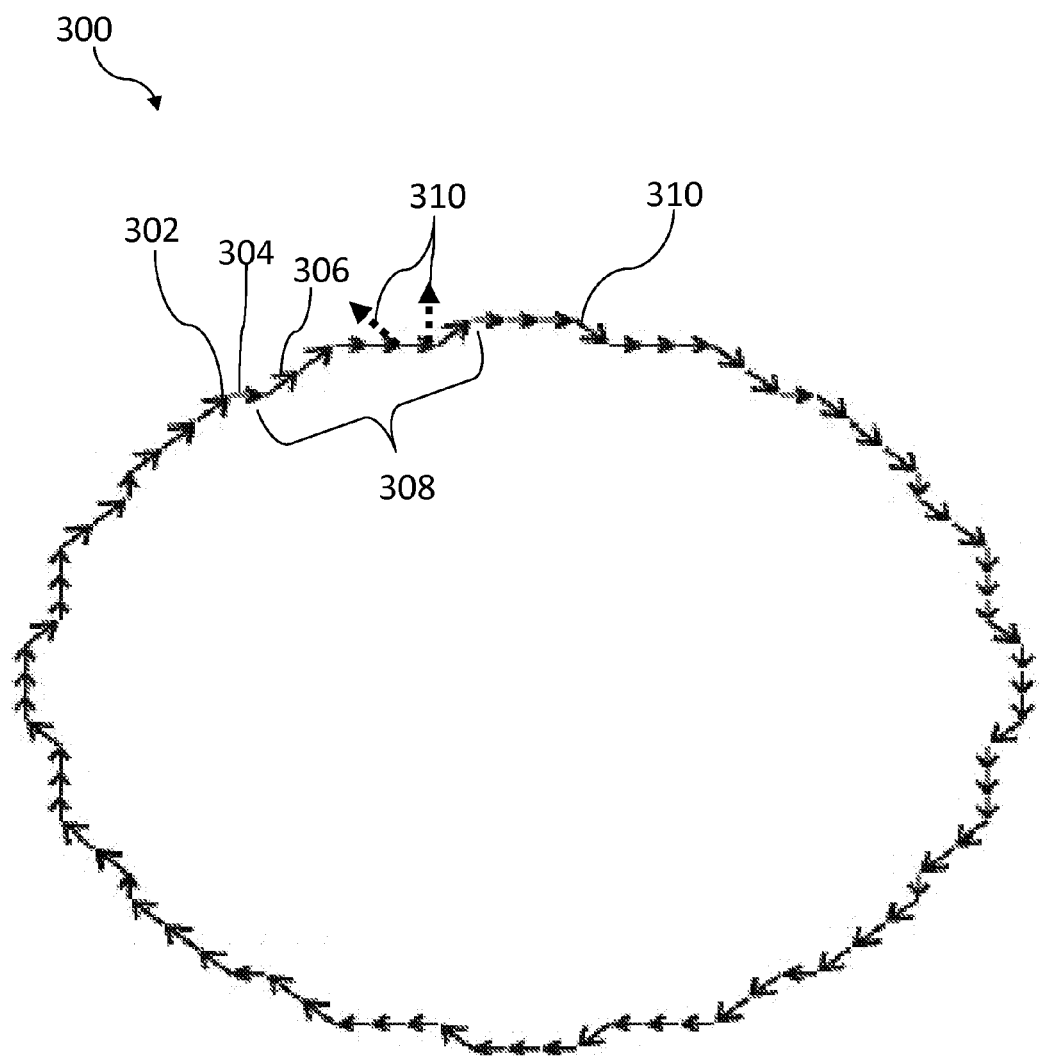
FIG. 3 is a diagram of an ellipse in accordance with an embodiment of the invention.

An illustrative example of an ellipse 300 is illustrated in FIG. 3. The contour of the ellipse is traced in a clockwise direction; at a point 302, the process is in (for example) a first state S0. The next code is one for a right arrow 304, which (in this example) is an allowed code that triggers a transition to a second state S1. In the second state S1, there are two allowed codes that maintain that state: those for the right arrow 304 and an up-right arrow 306. The next run 308 of ten arrows contains a mixture of right arrows 304 and up-right arrows 306; as each of the corresponding codes in the run 308 is encountered, the process remains in the second state S1. Once a down-right arrow 310 is encountered, however, the process transitions into a third state S2, which has still another set of state-maintaining codes and state-transitioning codes. The tracing continues around the entire contour 300; if the beginning point is re-attained without the encountering of any disallowed codes (such as those corresponding to the arrows 310), the object is deemed to be round.

Figure 4:
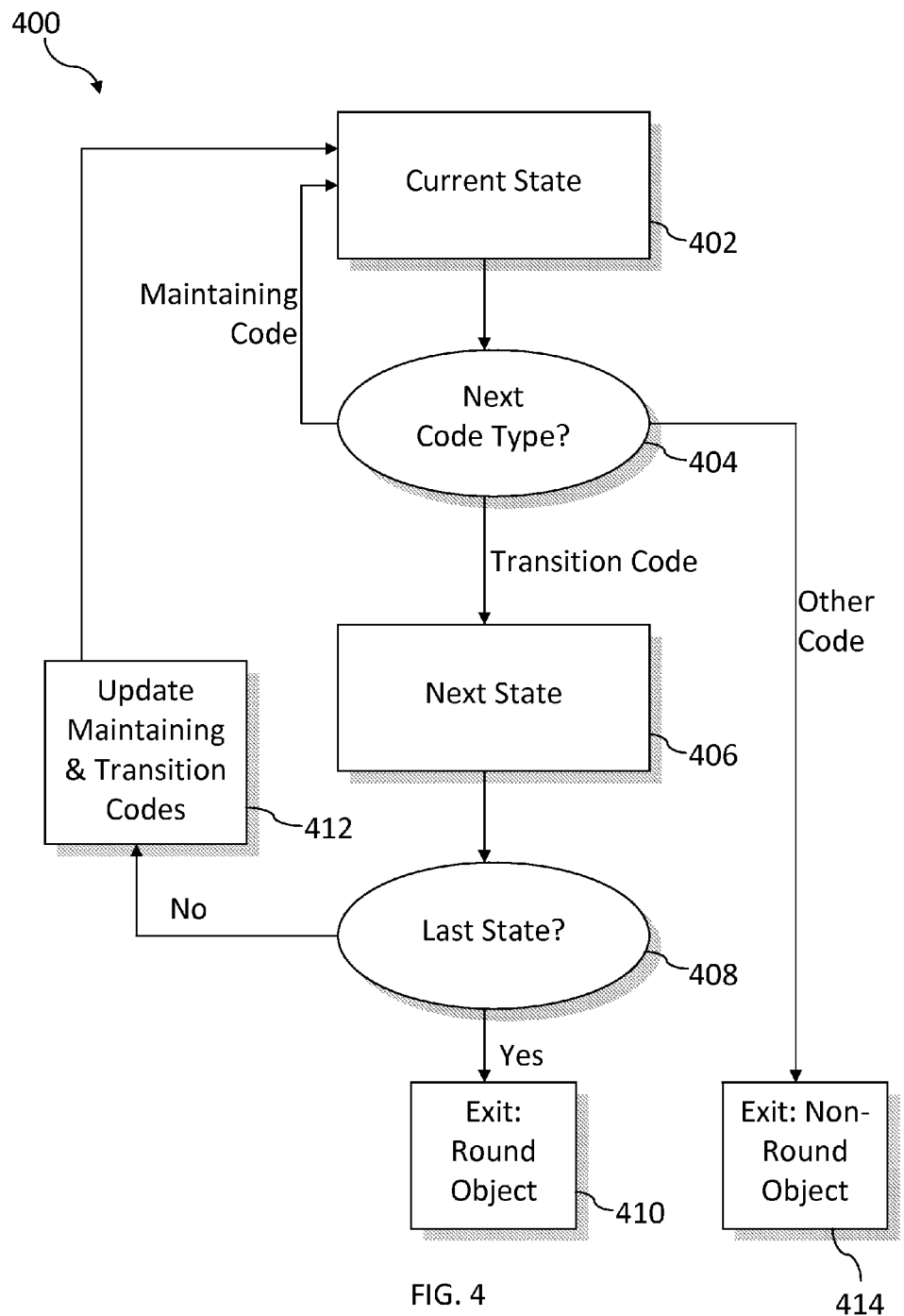
FIG. 4 is a flowchart of a method for detecting round objects in an image in accordance with an embodiment of the invention.

A more general illustration of one embodiment of the current invention is shown in the flowchart 400 in FIG. 4. A current state 402 is maintained, and a next code type in the contour of an object is examined at step 404. If the next code is a maintaining code, the process remains in the current state 402. If, however, the next code is a transition code, the process transitions to a next state 406. If the next state 406 is a "last" state 408 (meaning that a predetermined number of states has been reached, as explained in greater detail below), the object is deemed to be a round object and the process exits at step 410. If the next state 406 is not the last state, the maintaining and transition codes are updated at step 412 to reflect the next state 406, the next state 406 becomes the current state 402, and the process continues. If a next code type 404 is a code other than a transitioning or maintaining code, however, the object is deemed a non-round object and the process exits at step 414.

Figure 5A:
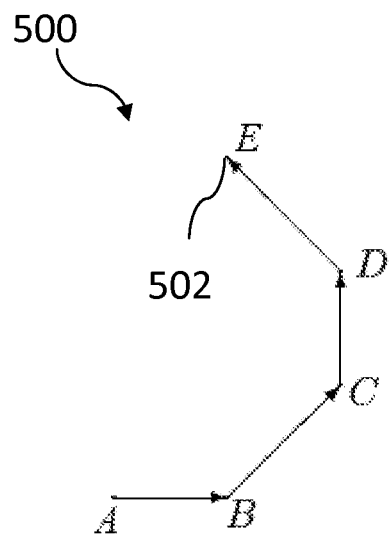
FIGS. 5A and 5B are diagrams of contours problematic for Freeman chain codes.
Figure 5B:
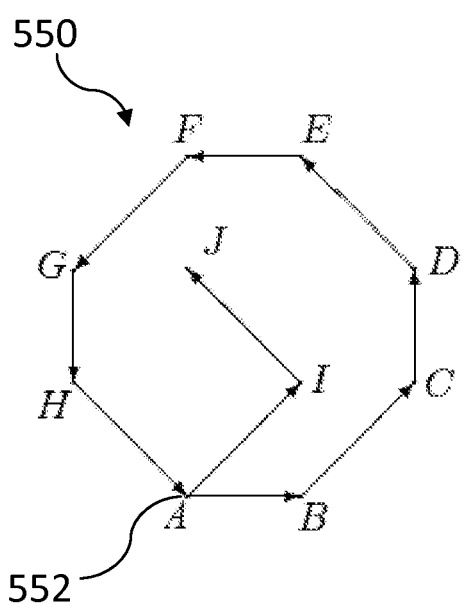

In one embodiment, the code types examined in step 404 are computed on-the-fly as each contour is encountered. In another embodiment, a preprocessing pass is made across the image, and each pixel is assigned a code type before the method 400 of FIG. 4 begins. A traditional chain-code naming scheme (such as Freeman chain codes) may be unsuitable for this pre-processing operation, however. For example, as shown in FIG. 5A, a point 502 at the end of a contour 500 is undefined by Freeman chain codes because it has no next pixel in the contour. In addition, referring to the shape 550 in FIG. 5B, a point 552 may be undefined because it may be assigned different values depending on the contour traced; the point 552 receives a first value if the contour H-A-I-J is traced, for example, and a second value if the contour H-A-B-C is traced. Other shapes, such as ones having junctions of finite thickness, may similarly lead to ambiguous points (due to, for example, the finite size of edge-detection filters); the current invention is not limited to any particular type of ambiguity-producing shape. In one embodiment of the present invention, end-contour pixels (such as pixel 502) are assigned a first unique code (different from any of the codes already present in the Freeman chain codes) and multi-contour pixels (such as pixel 552) are assigned a second unique code. "Background" pixels (i.e., pixels in the image that are not part of any contour) may be assigned yet another unique code.

Figure 1A:
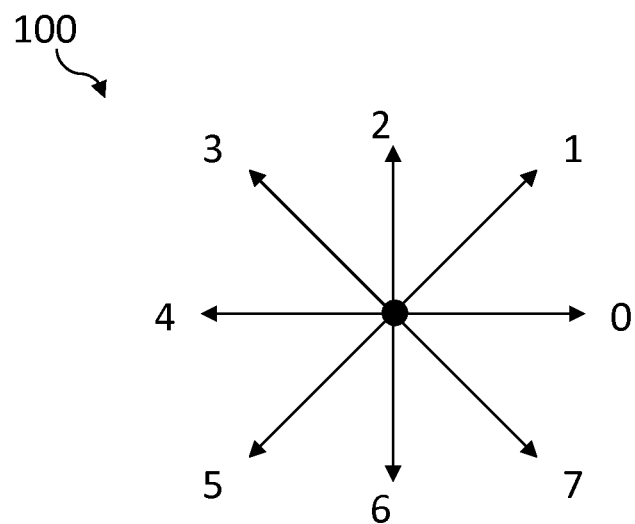
FIG. 1A is a diagram of a directional compass of Freeman chain codes.
Figure 1B:
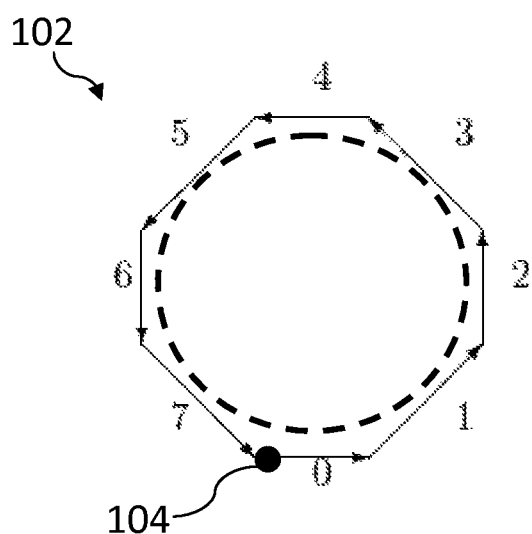
FIG. 1B is a diagram of a circle labeled with Freeman chain codes.
Figure 2:
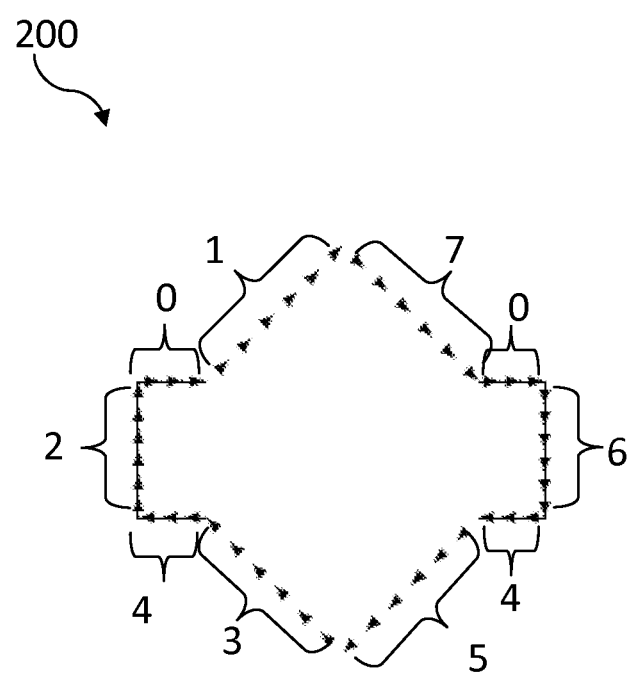
FIG. 2 is a diagram of a shape having an evenly-distributed histogram of chain codes.
Figure 6A:
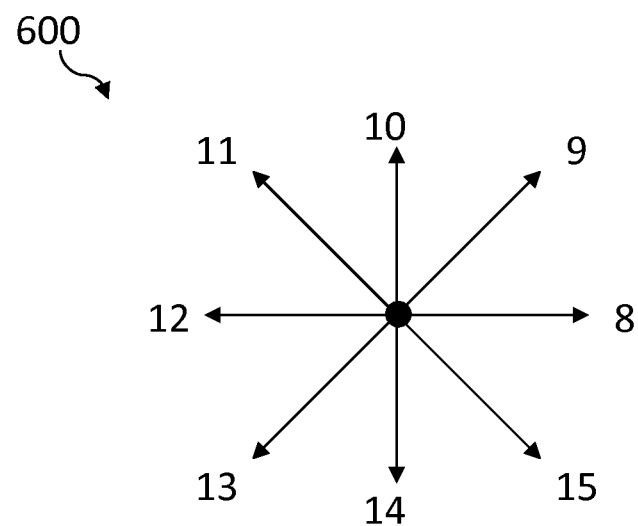
FIG. 6A is a diagram of a directional compass of extended chain codes in accordance with an embodiment of the invention.
Figure 6B:
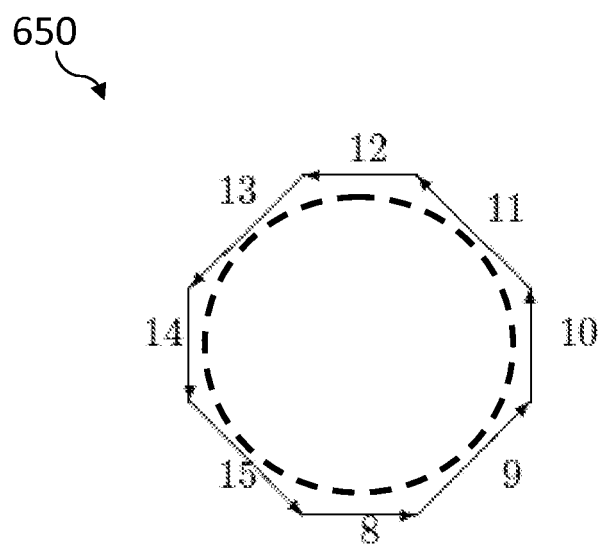
FIG. 6B is a diagram of a circle labeled with extended chain codes in accordance with an embodiment of the invention.

One example of a coding scheme to extend a chain code to account for end-contour, multi-contour, and background pixels is shown in FIG. 6A. The directional compass 600 illustrates that the existing Freeman codes (as shown in FIG. 1A) have been increased in value so that they range from 8-15 (instead of 0-7). FIG. 6B illustrates a circle 650 labeled with the new codes. In this embodiment, background pixels are labeled with "0," end-contour pixels are labeled with "1," and multi-contour pixels are labeled with "2." The current invention is not limited to any particular numbering scheme, however, and one of skill in the art will understand that the numbers may be changed without deviating from the spirit of the invention.

Referring to both the flowchart 400 of FIG. 4 and the extended chain codes 600 of FIG. 6A, a table 700 of next-state codes is shown in FIG. 7. Eight states 702 are defined; each state has a next state 704 that is entered upon encountering a state-transition code 706. If a state-maintaining code 708 is encountered, the process stays in the original state 702. If, in any given state 702 a code is encountered that is not a member of either the state-transition codes 706 or the state-maintaining codes 708, the process ends because the object is not round.

Figure 8:
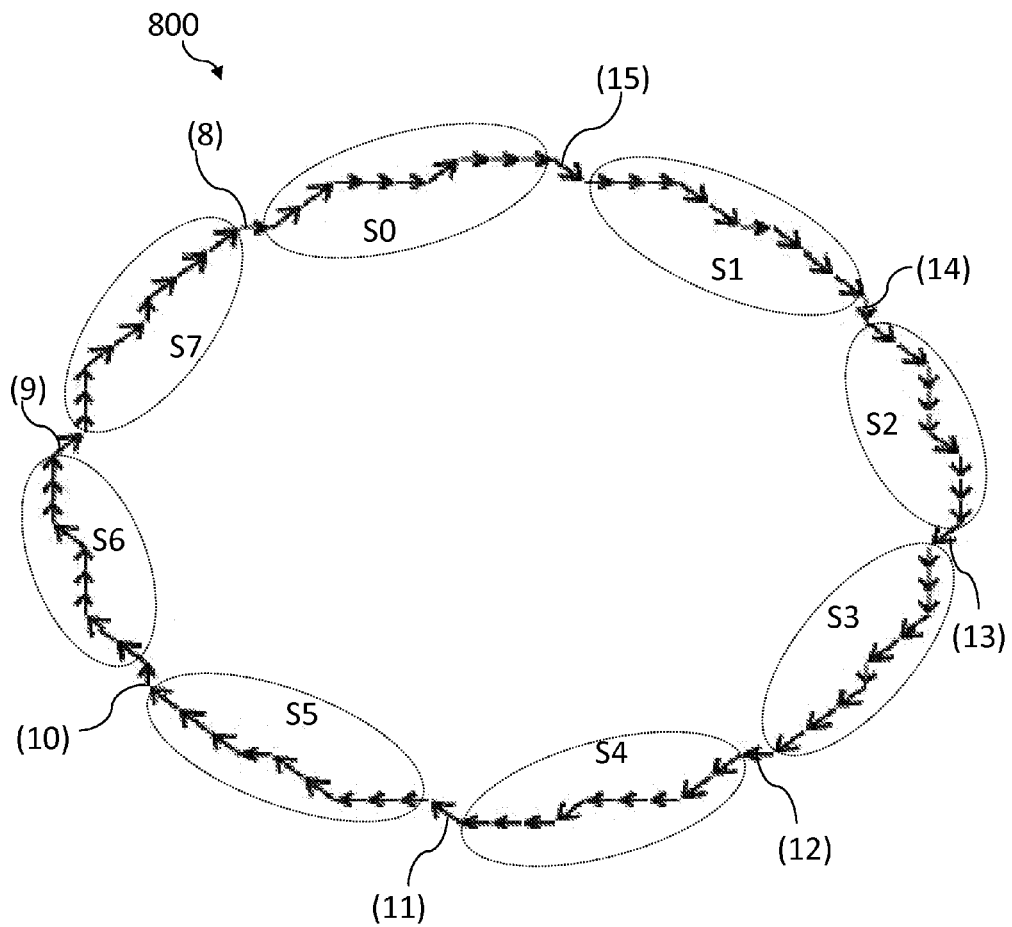
FIG. 8 is a diagram of an ellipse and its states in accordance with an embodiment of the invention.

Use of the table 700 of next-state codes is shown graphically by the ellipse 800 in FIG. 8. Groups of arrows corresponding to the eight states are identified as such, as are the transition codes between states. For example, the first state S0 includes codes of types 8 and 9 (i.e., right and up-right arrows) and, and it transitions to the second state S1 upon discovery of a transition code 15 (i.e., a down-right arrow). Similarly, the second state S1 includes codes of types 8 and 15 and transitions to a third state S2 upon discovery of a transition code 14. The process continues until the "last" state (i.e., S7) is found and/or a final transition back to the original state is detected. Inherent in this sequence of states is a further requirement that each state is encountered only once (aside from the begin/end state); if a state is re-encountered, the object may be some kind of spiral and not a round object.

The above discussion assumes that the contour for an object in the image is directed in a clockwise direction around the object. As one of skill in the art will understand, the preprocessing step may produce a contour that traces the object in a counter-clockwise direction. If the contour is counter-clockwise, an alternate state-transition table 900, as shown in FIG. 9, may be used to navigate the states associated with the object.

A first step, before beginning the tracing of a contour in accordance with the method described above, is locating a contour in the image. In one embodiment, the image is scanned in raster-scan order (i.e., row-by-row from top to bottom and, within each row, pixel-by-pixel from left to right). The codes corresponding to contours are identified, and the contours are then traced in accordance with the method 400 shown in FIG. 4. The current invention is not limited to any particular scan order or method for locating contours. In one embodiment, however, only one code is searched; because ellipses and circles contain all states and codes (by definition), searching for one state (by searching for one or more of its corresponding codes) yields all of the ellipses and circles in the image. In a related embodiment, one code is searched for clockwise contours and a second code is searched for counter-clockwise contours; the two types of contours may be searched in a single pass of the image or in separate passes. The direction of the contour (i.e., clockwise or counter-clockwise) may be determined from the position of the current code and/or its relationship with neighboring codes (or by any other method known in the art).

Figure 10:
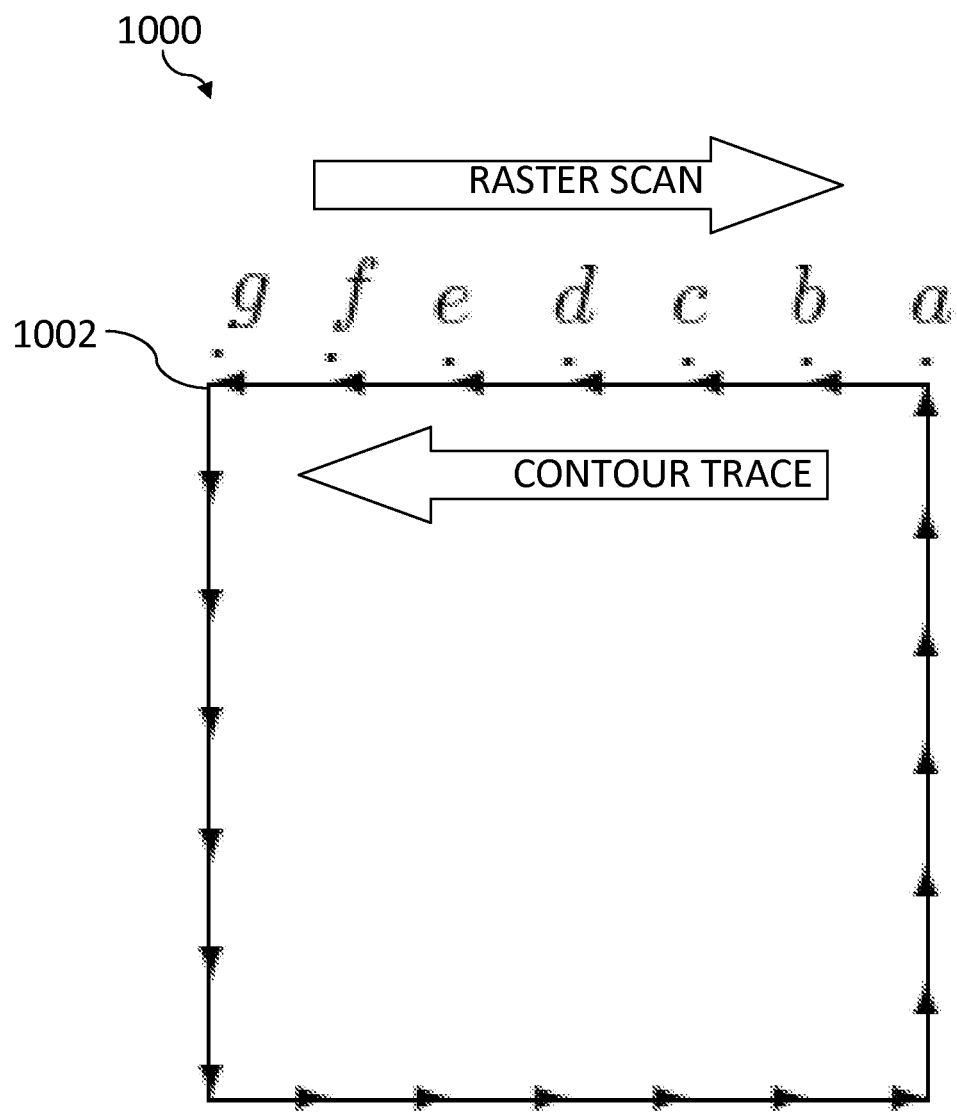
FIG. 10 is a diagram of a square in accordance with an embodiment of the invention.

The direction of scanning of the image may make the searching of some codes more efficient than others. Given the shape 1000 shown in FIG. 10, for example, selection of the code 12 (i.e., "left arrow") may lead to an inefficient left-to-right raster-scan based search. As the pixel g is first encountered, the shape 1000 is traced in a counter-clockwise direction in accordance with the method 400 shown in FIG. 4; when the corner 1002 is encountered, however, the shape 1000 is deemed non-circular because of the illegal (i.e., too-sharp) transition at the corner 1002. At the next pixel f, however, the process again traces back to the corner 1002 to again determine the shape 1000 is non-circular, and so on for the rest of the pixels e, d, c, b, a, thereby wastefully duplicating effort. While the shape 1000 may be simple enough to, for example, set a flag the first time the corner 1002 is reached, other such shapes are more complicated, and setting a flag to rule them out may create many false-negative determinations.

In one embodiment, therefore, codes other than that of the opposite direction of motion are chosen for searching. For example, given the top-to-bottom and left-to-right search pattern for FIG. 10, one of codes 8, 13, 14, or 15 may be chosen (i.e., right, left-down, down, and right-down). One of skill in the art will realize that similar codes may be chosen for different scan orders.

Figure 11A:
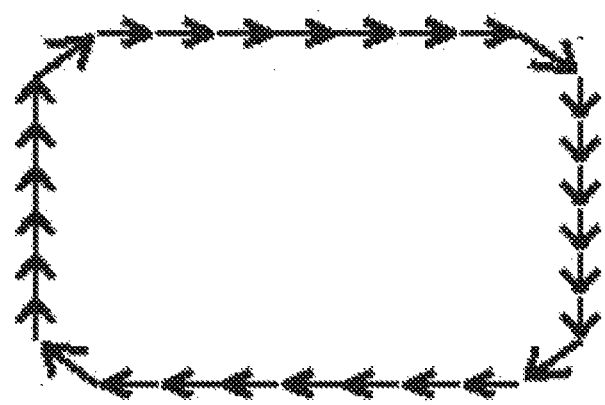
FIGS. 11A and 11B are diagrams of shapes having round-object-like state transitions in accordance with an embodiment of the invention.
Figure 11B:
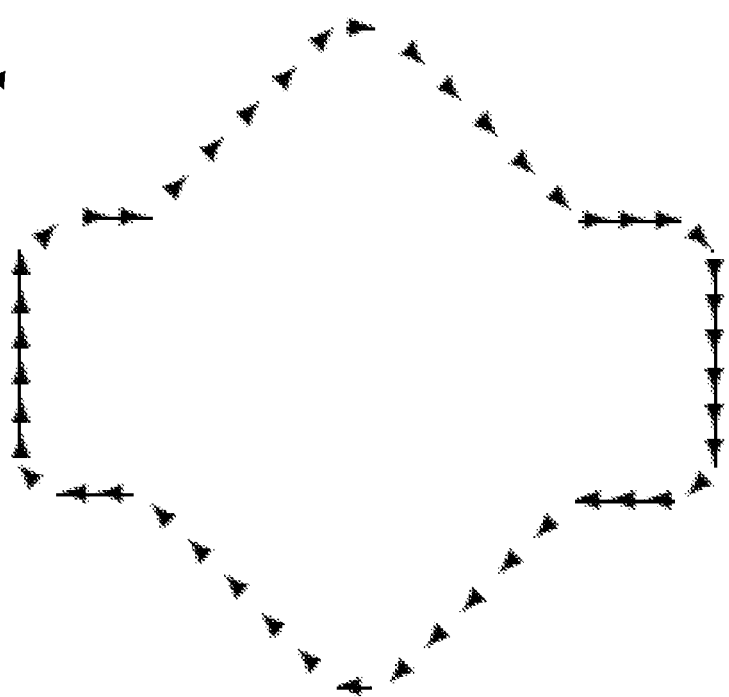

Once a contour has been identified and once the process 400, as shown in FIG. 4, has determined that the object belonging to the contour is round, further analysis may be used to weed out any non-round object incorrectly identified by the process 400 as round. In another embodiment, these steps of further analysis may be run in conjunction with the process 400. Some objects, such as the rectangle 1100 in FIG. 11A, may give the same state transitions as a circle/ellipse; in this case, a histogram may be taken of the rectangle 1100 and analyzed to reveal its non-round shape. Other objects, however, such as the shape 1150 in FIG. 11B, have the same state transitions as a circle/ellipse and have a circle-like histogram. Additional analysis may therefore be used to detect the non-round nature of shapes like that of FIG. 11B.

In one embodiment, the gradient of the contour direction is examined and evaluated. In one embodiment, the average is taken of the current code and a certain number of preceding codes (e.g., the three or four previous codes) at each point; the gradient of the contour direction is computed as taking the difference between the average computed for the current point and the average computed for the previous point. The average taken at a particular point roughly indicates the direction of the contour at that particular point. For a circle, the gradient is a constant, nonzero value; for an ellipse, the gradient may vary by a small amount throughout the contour. Because a round object contains no straight lines, its gradient is never zero; because a round object includes no sharp corners, its gradient does not change rapidly; and because a round object includes no inflection or "S"-curve points, its gradient is always positive (or always negative, depending on how it is computed). By contrast, a square or octagon, for example, has a mostly zero gradient with occasional large spikes (at the corners of the objects).

In one embodiment, the gradient (and/or average) is computed at each new pixel encountered and is compared to threshold values. If the gradient is lower than a first threshold (e.g., zero or close to zero) or higher than a second threshold (e.g., reflective of a too-sharp corner transition), the object may be deemed non-round. Likewise, if the gradient crosses zero (i.e., changes in a first direction and then in a second direction), the object may also be deemed non-round.

Figure 12A:
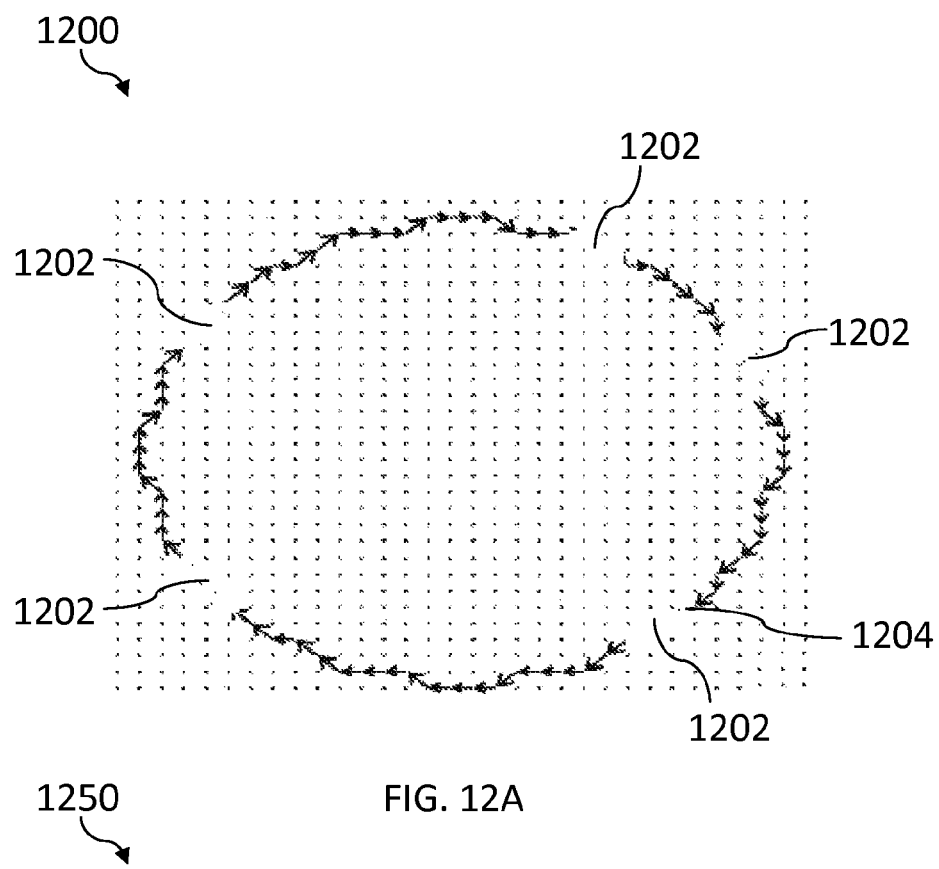
FIGS. 12A and 12B are diagrams of partially occluded shapes.
Figure 12B:
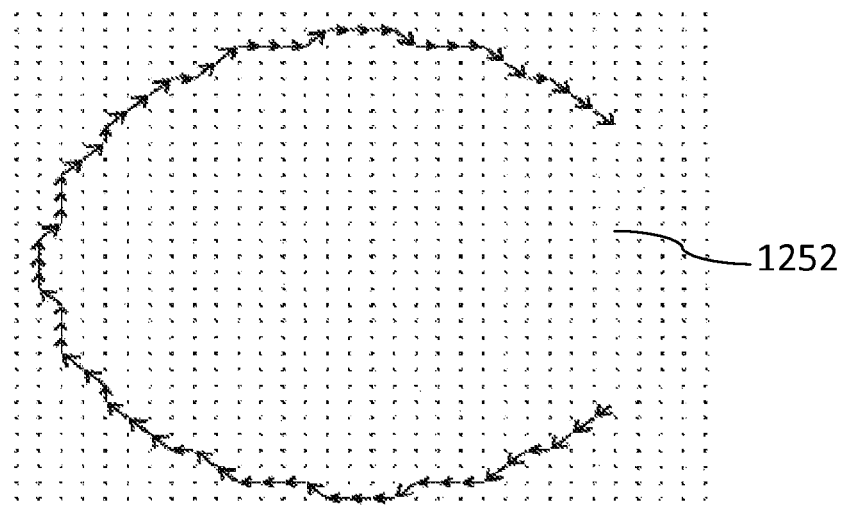
Figure 13:
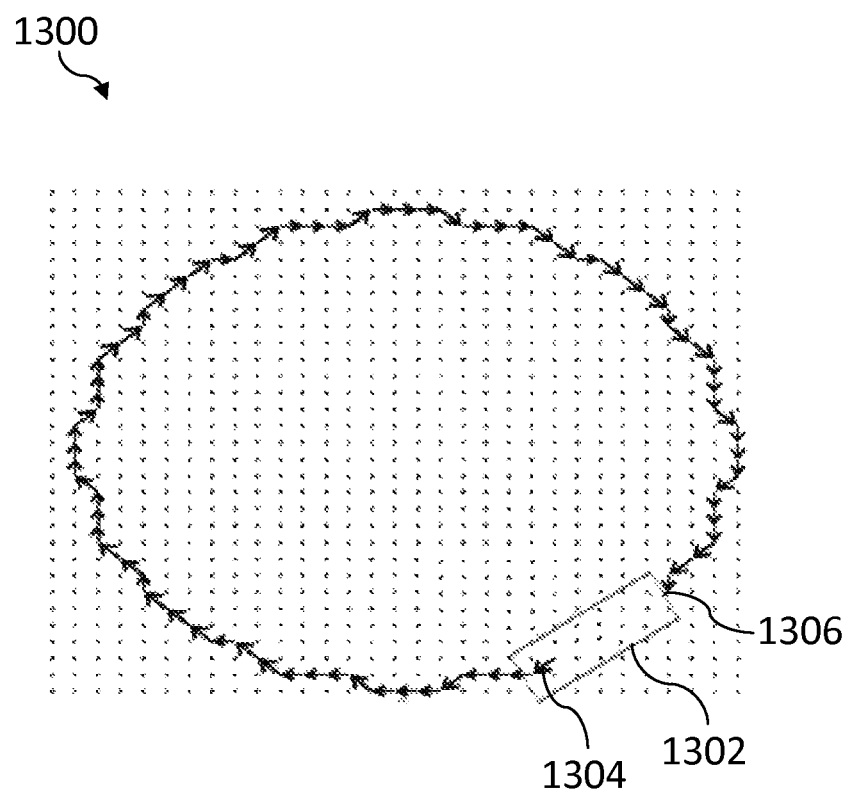
FIG. 13 is a diagram of an occlusion search window in accordance with an embodiment of the invention.

In some cases, a complete contour may not exist for an object. Ambient noise, lighting variation, and other such factors may cause imprecise chain codes by occluding part of the contour of an image. The shape 1200 in FIG. 12A, for example, includes broken areas 1202, and the shape 1250 in FIG. 12B includes a missing portion 1252. In one embodiment, when a missing portion of the contour is encountered (such as the pixel 1204 just before one of the gaps 1202), the surrounding area is searched for the next portion of the contour after the gap. As shown by the shape 1300 in FIG. 13, a search window 1302 may be defined and searched within for a next symbol 1304.

The orientation and/or size of the search window 1304 may be determined by the value of the average of the last few (e.g., four) chain codes; this average may have already been computed for, or may be re-used by, the analysis of the gradient of the shape 1330, as discussed above. The size of the window 1304 (i.e., its length and/or width) may further depend on the number of chain codes previously encountered and traced. If, for example, only a few chain codes have been traced and a gap is found, the search window 1304 may be small; the source image may be littered with many small, partial contours, and creating a large search window 1304 for every sequence of two or three linked codes (for example) may be wasteful. As the number of traced chain codes grows, however, and a gap is found, the search window 1304 may be increased in size to reflect the greater confidence that the currently traced contour corresponds to an actual object, and that an investment in searching a larger area is worthwhile.

In one embodiment, as described above, a pixel that ends a contour (such as the pixel 1306 in FIG. 13) is assigned an extended chain code (e.g., "1"). The method 400 (as shown in FIG. 4) may enter into a search mode when this extended chain code is encountered; if the next code 1304 is discovered in the window 1302, the method 400 continues and, if not, exits. If the next code 1304 is found, the "missing" codes may be derived for the purposes of creating a histogram of the shape 1300, computing the average code of the shape 1300, and/or computing the gradient of the shape 1300.

As described above, when searching for contours in an image, the process may search for only a single code because a round object contains all codes. In some cases, however, an occlusion may prevent that code from inclusion in a contour. For example, if code 14 ("down arrow") is searched, the contour 1250 of FIG. 12B may not be found because the missing part 1252 includes all of the code-14 codes from the contour 1252. In one embodiment, two "opposite" codes are searched (e.g., both the "down-arrow" code 14 and the "up-arrow" code 10). Searching on opposite sides of the contour 1250 may decrease the chances that an occlusion would prevent the detection of the contour 1250 at least because it is less likely that two occlusions are blocking two sides of the contour 1250. In a related embodiment, only a first code is searched in even lines of the image and the second, opposite code is searched in odd lines of the image to thereby cut down on processing time.

As described above, certain codes may be preferred for searching, given a particular orientation for scanning the image, to reduce duplicative tracing of non-round shapes. For example, codes 8, 13, 14, or 15 may be searched when scanning the image in raster-scan order. In one embodiment, in a first pass through the image to identify clockwise-coded shapes, code 8 and its near-opposite code 14 are searched; in a second pass to identify counter-clockwise-coded shapes, code 13 and its near-opposite code 15 are searched.

Although the above description related to searching for round objects in images, one of skill in the art will recognize that it may be extended to search for other shapes. The state transition tables 700, 900 may be edited to have different state-transition and/or state-maintaining codes, and the number of states may be changed, as appropriate. Similarly, the gradient, average, and histogram of the new shape or shapes may be analyzed and expected values computed for use with the above analysis.

Figure 14:
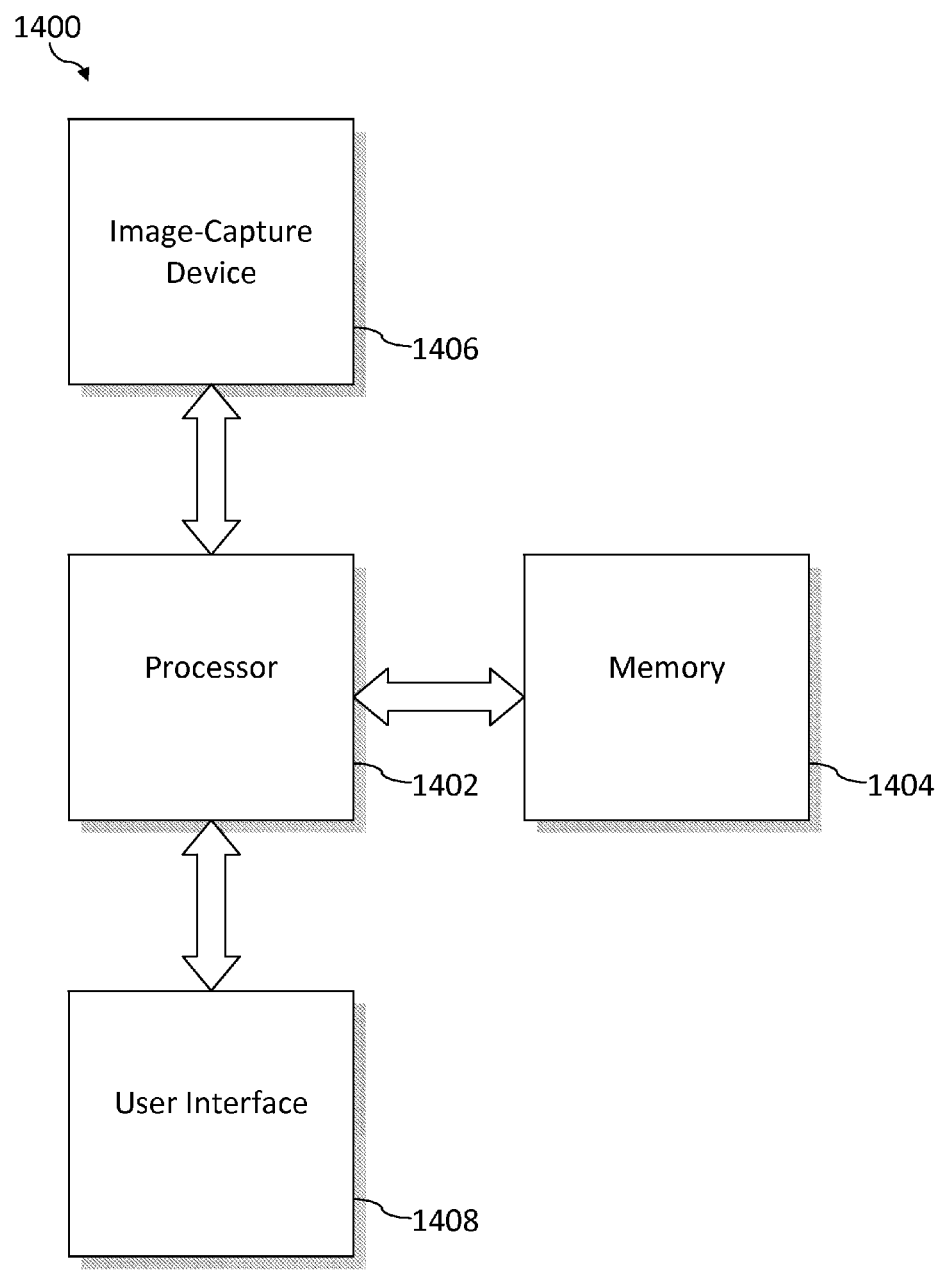
FIG. 14 is a block diagram of a system for detecting round objects in digital images in accordance with an embodiment of the invention.

A system 1400 for detecting round objects in accordance with embodiments of the invention is shown in FIG. 14. A processor 1402 is used to traverse the contour of an unknown object while maintaining one of a series of states, as described above with reference to FIG. 4, and deems the object round of all of a plurality of predetermined states are reached. The processor 1402 may be any computer processor, such as a digital-signal processor, general-purpose microprocessor, application-specific integrated circuit, or microcontroller. A memory 1404 may be used to store the image, chain codes, transition tables 700, 900, or any other data or information; the memory 1404 may include local and/or system memory, volatile or non-volatile memory, or any other type of short- or long-term storage. An image-capture device 1406 may be used to capture the image; the processor 1402 may be used to convert the captured image into a monochrome image by, e.g., comparing the pixels in the captured image to a threshold (or by any other method known in the art). The processor 1402 may also be used to assign chain-code values to pixels in the image. A user interface 1408 may be used to issue commands to, or receive data from, the processor 1402. The system 1400 may be mounted on a vehicle and used to detect traffic signs; in other embodiments, the system 1400 is mounted on an assembly-line or other industrial device and used for identifying round-shape components.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for identifying an object in a digital image stored in a computer memory as an array of pixels, the method comprising:
    traversing the pixels corresponding to a contour of an unknown object in the digital image, wherein traversing comprises:
        i. loading a next chain-code symbol in the contour into a computer memory;
        ii. maintaining a current state if the next chain-code symbol in the contour is within a first set of chain-code symbols;
        iii. transitioning to a next state if the next chain-code symbol in the contour is within a second set of chain-code symbols; and
        iv. designating the unknown object as a first type of object if the next chain-code symbol is within neither of the first or second sets of chain-code symbols,
    wherein the unknown object is identified as a second type of object if a predetermined number of states are visited.

2. The method of claim 1, wherein the first type of object comprises a non-round object and the second type of object comprises a round object.

3. The method of claim 2, wherein the extended chain codes comprise a code for an end-of-contour pixel and a code for a multi-contour pixel.

4. The method of claim 1, further comprising assigning extended chain codes to pixels in the digital image.

5. The method of claim 1, further comprising searching for the contour in the digital image.

6. The method of claim 5, wherein searching for the contour comprises searching for a chain code in the digital image.

7. The method of claim 6, further comprising searching for an opposite chain code in the digital image.

8. The method of claim 5, wherein searching for the contour comprises searching for a first chain code in clockwise objects in the digital image and for a second chain code in counter-clockwise objects in the digital image.

9. The method of claim 1, further comprising filtering the unknown object via a chain-code histogram.

10. The method of claim 1, further comprising:
    computing a gradient of a plurality of previous chain-code symbols; and
    designating the unknown object as a non-round object if the gradient is less than a first threshold or greater than a second threshold.

11. The method of claim 10, wherein computing the gradient comprises computing a first average of a first set of previous chain-code symbols, a second average of a second set of previous chain-code symbols, and computing the difference of the first and second averages.

12. The method of claim 1, further comprising:
    detecting a break in the contour of the unknown object;
    searching an area of the image for the next chain-code symbol past the break.

13. The method of claim 12, wherein a size of the area depends at least in part on an average direction of a plurality of previous chain codes or a number of previous chain codes.

14. A system for identifying an object in a digital image, the system comprising:
    a computer memory for storing chain-code symbols related to a contour of an unknown object in the digital image;
    a processor for traversing the contour by executing instructions for:
        i. maintaining a current state if a next chain-code symbol is within a first set of chain-code symbols;
        ii. transitioning to a next state if the next chain-code symbol is within a second set of chain-code symbols; and
        iii. designating the unknown object as a first type of object if the next chain-code symbol is within neither of the first or second sets of chain-code symbols,
    wherein the unknown object is identified as a second type of object if a predetermined number of states are visited.

15. The system of claim 14, further comprising an image-capture device for capturing the digital image.

16. The system of claim 14, further comprising a user interface for issuing commands to, or receiving data from, the processor.

17. The system of claim 14, wherein the system is mounted on a vehicle.

18. The system of claim 14, wherein the second type of object is a round object and the object is a road sign.

19. A non-transitory computer-readable hardware apparatus having one or more computer-readable programs stored thereon for identifying an object in a digital image stored in a computer memory as an array of pixels, that when executed on a processor configure the processor to perform one or more operations comprising:
    traversing the pixels corresponding to a contour of an unknown object in the digital image, wherein traversing comprises:
        i. loading a next chain-code symbol in the contour into a computer memory;
        ii. maintaining a current state if the next chain-code symbol in the contour is within a first set of chain-code symbols;
        iii. transitioning to a next state if the next chain-code symbol in the contour is within a second set of chain-code symbols; and
        iv. designating the unknown object as a first type of object if the next chain-code symbol is within neither of the first or second sets of chain-code symbols,
    wherein the unknown object is identified as a second type of object if a predetermined number of states are visited.

20. The non-transitory computer-readable hardware apparatus of claim 19, wherein the first type of object comprises a non-round object and the second type of object comprises a round object.

21. The non-transitory computer-readable hardware apparatus of claim 20, wherein the round object is a road sign.

22. The non-transitory computer-readable hardware apparatus of claim 19, further comprising assigning extended chain codes to pixels in the digital image, wherein the extended chain codes comprise a code for an end-of-contour pixel and a code for a multi-contour pixel.

23. The non-transitory computer-readable hardware apparatus of claim 19, further comprising searching for the contour in the digital image, wherein searching for the contour comprises searching for a chain code in the digital image.

24. The non-transitory computer-readable hardware apparatus of claim 19, further comprising searching for the contour in the digital image, wherein searching for the contour comprises searching for a first chain code in clockwise objects in the digital image and for a second chain code in counter-clockwise objects in the digital image.

25. The non-transitory computer-readable hardware apparatus of claim 19, further comprising:
computing a gradient of a plurality of previous chain-code symbols; and
designating the unknown object as a non-round object if the gradient is less than a first threshold or greater than a second threshold.

26. The non-transitory computer-readable hardware apparatus of claim 25, wherein computing the gradient comprises computing a first average of a first set of previous chain-code symbols, a second average of a second set of previous chain-code symbols, and computing the difference of the first and second averages.

27. The non-transitory computer-readable hardware apparatus of claim 19, further comprising:
detecting a break in the contour of the unknown object;
searching an area of the image for the next chain-code symbol past the break.

28. An apparatus for identifying an object in a digital image, the apparatus comprising:
means for storing chain-code symbols related to a contour of an unknown object in the digital image;
means for traversing the contour by executing instructions for:
i. maintaining a current state if a next chain-code symbol is within a first set of chain-code symbols;
ii. transitioning to a next state if the next chain-code symbol is within a second set of chain-code symbols; and
iii. designating the unknown object as a first type of object if the next chain-code symbol is within neither of the first or second sets of chain-code symbols,
wherein the unknown object is identified as a second type of object if a predetermined number of states are visited.

29. The apparatus of claim 28, further comprising means for assigning extended chain codes to pixels in the digital image, wherein the extended chain codes comprise a code for an end-of-contour pixel and a code for a multi-contour pixel.

30. The apparatus of claim 28, further comprising means for searching for the contour in the digital image, wherein searching for the contour comprises searching for a first chain code in clockwise objects in the digital image and for a second chain code in counter-clockwise objects in the digital image.

* * * * *